Patented Feb. 6, 1934

1,945,577

UNITED STATES PATENT OFFICE 1,945,577

TREATMENT OF RUBBER

William P. ter Horst, Akron, Ohio, assignor to The Naugatuck Chemical Company, Naugatuck, Conn., a corporation of Connecticut No Drawing. Original application October 13, 1930, Serial No. 488,560. Divided and this application December 10, 1932. Serial No. 646,713

14 Claims. (Cl. 18—50)

This invention relates to the treatment of rubber and similar vulcanizable materials, more particularly to treatment of the same with certain derivatives of reaction products of secondary aromatic amino compounds and aliphatic ketones. The invention also relates to the products of such treatment. This case is a division of case Serial No. 488,560, filed Oct. 13, 1930.

An object of this invention is to provide materials having the property of retarding the deterioration of rubber.

Other objects will be apparent from the following detailed description.

Reaction products of secondary amino compounds and aliphatic ketones may be prepared by reacting the amino compound and the ketone either with or without the aid of a suitable catalytic dehydrating agent. By this is meant that high molecular weight ketones and amines of high boiling point do not require the use of catalysts for economic production of reaction products, but that with low boiling amines and ketones the reaction products cannot be prepared economically without the use of a suitable catalytic agent. Examples of products within the invention are the reaction products of acetone and diphenylamine, acetone and phenyl alpha-naphthylamine, acetone and phenyl beta-naphthylamine, acetone and diphenyl ethylene diamine, acetone and mono ethyl aniline, methyl ethyl ketone and phenyl alpha-naphthylamine, mesityl oxide and phenyl alpha-naphthylamine, acetone and diphenyl formamidine, mesityl oxide and phenyl beta-naphthylamine, acetone and diortho tolyl guanidine acetone and diphenyl guanidine, acetone and p-p′ (dinaphthylamino) diphenyl methane, acetone and ortho tolyl biguanide. Their preparation is illustrated by the following procedures:

*Example A.*—The reaction between acetone and diphenyl amine is preferably carried out at relatively high temperatures and high pressures in the presence of a dehydration agent, such as iodine, which also has a catalytic effect on the reaction. The amount of acetone may vary from one to three moles per mole of diphenylamine. For example 320 pounds of diphenylamine, 220 pounds of acetone, 600 grams of iodine are heated during 20 hours at approximately 220° C. The pressure is approximately 600 pounds per square inch at this temperature. An iron autoclave may be used with or without agitation. At the end of about 20 hours the contents are cooled and the excess acetone and water formed are distilled off. The remaining product is a dark brown liquid which may be used as such or further purified. The reaction time may be shortened by raising the temperature, for example at a temperature of 260° C. a reaction time of 12 hours is sufficient. It has also been found that increasing the amount of iodine shortens the time of reaction, for example the use of 1000 grams of iodine allows a satisfactory reaction at 220° C. in about 12 hours. Instead of using iodine, hydrochloric acid may be used.

*Example B.*—Reaction product of acetone and phenyl beta naphthlamine: A mixture of 219 grams phenyl beta naphthylamine, 696 grams acetone and 10 grams of iodine are heated at approximately 210 to 220° C. during 33 hours. The pressure at this temperature is approximately 600 pounds per square inch. The crude reaction product is filtered through glass wool and the excess of acetone and the water formed during the reaction are removed by distillation.

*Example C.*—The reaction product of acetone and phenyl alpha-naphthyl-amine. This chemical is made according to the general procedure, namely by heating a mixture of 219 grams phenyl alpha naphthlamine, 116 grams of acetone, and 1.3 grams of iodine during 20 hours at approximately 210 to 220° C. The product which remains after removal of acetone and water is a free-flowing oil.

Other ketones than those mentioned that may be used are phorone, diethyl ketone, monochlor-acetone, dichloracetone, aldol-acetone, diacetyl, acetyl-acetone, acetonyl acetone, di-acetone alcohol, ethylidene-acetone, allyl-acetone, aceto-phenone, benzal acetone, furfural-acetone, salicyl aldehyde-acetone, cyclo-pentanone, cyclohexanone. Other secondary amino compounds than those mentioned that may be used are dinaphthyl amines, naphthyl amino diphenyl, carbazole, p-nitro diphenylamine, 2,4 dinitro-diphenylamine, p-amino-diphenylamine, p-hydroxy-diphenylamine, sym-diphenyl-p-phenylene diamine, p-amino benzyl-aniline, p-amino p′-naphthylamino diphenyl methane, sym-dinaphthyl-p-phenylene diamine, phenyl beta naphthyl guanidine, phenyl o-tolyl guanidine, di-o-tolyl biguanide, mono phenyl biguanide, diphenyl biguanide. Certain dehydrating agents have been mentioned as giving particularly effective results, but the invention generally is not to be limited thereto. Other dehydrating agents may be used such as calcium chloride. sulfanilic acid, phosphorus pentoxide, sodium hydroxide, magnesium perchlorate, acetic acid, barium oxide, zinc chloride, the amine addition product with zinc chloride such as ($C_6H_5NH_2$), $ZnCl_2$, sulphuric acid, etc.

It is to be understood that the term "aliphatic ketone" includes both saturated and unsaturated aliphatic ketones of the open-chain and cyclo-aliphatic series, as well as hydroxyl- and halogen-substituted derivatives of such ketones, and ketones obtained by condensation of the foregoing with aldehyde and ketones,—and that the term also includes ketones comprising one aliphatic group and one aromatic group linked to the

group.

It is further to be understood that the term "secondary aromatic amino compound" includes broadly any aromatic amino compound which comprises at least one secondary amino nitrogen atom linked to an aromatic nucleus.

The present invention is illustrated with a preferred embodiment as follows:

*Example 1.*—Nitroso derivatives of the reaction product of acetone and diphenylamine. The reaction product contains secondary amino nitrogen and therefore a nitroso derivative may be prepared. The acetone-diphenylamine reaction product is dissolved in glacial acetic acid and a slight excess of a solution of sodium nitrite in water is added. The reaction mixture is then poured into a large volume of water, and the precipitate, the nitroso derivative, is filtered, washed and dried. This product possesses excellent antioxidant properties, as can be seen from the following results in a carbon black rubber stock in which hexamethylene tetramine and diphenyl guanidine were used as the accelerators:

| Green tensiles | Blank | +1.25 parts of the nitroso derivative |
|---|---|---|
| 60' at 45# | 4155 | 4261 |
| 75' at 45# | 4149 | 4031 |
| Aged tensiles 168 hrs. in oxygen | | |
| 60' at 45# | 1703 | 3028 |
| 75' at 45# | 1432 | 2964 |

The rubber may be treated with any single derivative or desired mixture of derivatives. Also in preparing the ketone-amine compounds, a mixture of ketones or a single ketone may be reacted with a single amino compound or with a mixture of amino compounds.

The invention may be used to retard the deterioration of inner tubes, tire treads, mechanical goods, footwear, rubber tiling stocks, latex and articles made from latex etc. The term "rubber" is to be construed broadly as covering rubber in any form including natural rubber, synthetic rubber, gutta percha, balata, or other rubber-like materials.

With the detailed description given above, it will be obvious that modifications will suggest themselves, for example other accelerators and suitable compounding ingredients may be used in conjunction with the antioxidants, all without departing from the principles of the invention, and it is not desired to limit the invention otherwise than as set forth in the appended claims.

Having thus described my invention, what I claim and desire to protect by Letters Patent is:

1. A process of treating rubber which comprises incorporating therewith a nitroso derivative of the reaction product of an aliphatic ketone and a secondary aromatic amino compound.

2. A process of treating rubber which comprises vulcanizing rubber in the presence of a nitroso derivative of the reaction product of an aliphatic ketone and a secondary aromatic amino compound.

3. A process of treating rubber which comprises incorporating therewith a nitroso derivative of the reaction product of an aliphatic ketone and a secondary aromatic amine.

4. A process of treating rubber which comprises vulcanizing rubber in the presence of a nitroso derivative of the reaction product of an aliphatic ketone and a secondary aromatic amine.

5. A process of treating rubber which comprises incorporating therewith a nitroso derivative of the reaction product of an aliphatic ketone and a diarylamine.

6. A process of treating rubber which comprises vulcanizing rubber in the presence of a nitroso derivative of the reaction product of an aliphatic ketone and a diarylamine.

7. A process of treating rubber which comprises incorporating therewith a nitroso derivative of the reaction product of acetone and a diarylamine.

8. A process of treating rubber which comprises vulcanizing rubber in the presence of a nitroso derivative of the reaction product of acetone and a diarylamine.

9. A process of treating rubber which comprises incorporating therewith a nitroso derivative of the reaction product of acetone and diphenylamine.

10. A process of treating rubber which comprises vulcanizing rubber in the presence of a nitroso derivative of the reaction product of acetone and diphenylamine.

11. A rubber product resulting from the process set forth in claim 1.

12. A vulcanized rubber product obtained according to the process of claim 2.

13. A rubber product resulting from the process set forth in claim 9.

14. A vulcanized rubber product obtained according to the process of claim 10.

WILLIAM P. TER HORST.